(12) United States Patent
Wilson (10) Patent No.: US 8,458,214 B1
(45) Date of Patent: Jun. 4, 2013

(54) TAXONOMY-BASED DATABASE PARTITIONING

(75) Inventor: Michael K. Wilson, San Jose, CA (US)

(73) Assignee: eBay Inc., San Jose, CA (US)

( * ) Notice: Subject to any disclaimer, the term of this patent is extended or adjusted under 35 U.S.C. 154(b) by 2679 days.

(21) Appl. No.: 09/992,594

(22) Filed: Nov. 13, 2001

Related U.S. Application Data (60) Provisional application No. 60/248,466, filed on Nov. 14, 2000.

(51) Int. Cl.
*G06F 7/00* (2006.01)

(52) U.S. Cl.
USPC .......................................... 707/778; 707/777

(58) Field of Classification Search
USPC ................................................ 707/777–778
See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,903,201 A | 2/1990 | Wagner |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |

(Continued)

FOREIGN PATENT DOCUMENTS

| | | |
|---|---|---|
| CA | 2253543 | 3/1997 |
| WO | WO 92/15174 | 2/1992 |

(Continued)

OTHER PUBLICATIONS

Malone, TW; Yates, J; et al., "Electronic Markets and Electronic Hierarchies", *Communications—of the ACM*, Jun. 1987, pp. 484-497, vol. 30, No. 6, USA.

(Continued)

*Primary Examiner* — Shahid Al Alam
*Assistant Examiner* — Joshua Bullock
(74) *Attorney, Agent, or Firm* — Schwegman, Lundberg & Woessner, P.A.

(57) ABSTRACT

In one aspect of the invention, a memory is described for facilitating splitting data by taxonomy. The memory is accessed by an application program, and includes one or more top-level categories, where each top-level category comprises a subset of the items; and also includes a category group corresponding to at least one of the top-level categories and the subset of the items belonging to the top-level categories.

10 Claims, 4 Drawing Sheets

U.S. PATENT DOCUMENTS

| | | | |
|---|---|---|---|
| 5,329,589 | A | 7/1994 | Fraser et al. |
| 5,375,055 | A | 12/1994 | Togher et al. |
| 5,394,324 | A | 2/1995 | Clearwater |
| 5,426,281 | A | 6/1995 | Abecassis |
| 5,485,510 | A | 1/1996 | Colbert |
| 5,553,145 | A | 9/1996 | Micali |
| 5,557,728 | A | 9/1996 | Garrett et al. |
| 5,598,557 | A * | 1/1997 | Doner et al. ............... 707/5 |
| 5,640,569 | A | 6/1997 | Miller et al. |
| 5,657,389 | A | 8/1997 | Houvener |
| 5,664,115 | A | 9/1997 | Fraser |
| 5,689,652 | A | 11/1997 | Lupien et al. |
| 5,694,546 | A | 12/1997 | Reisman |
| 5,706,457 | A | 1/1998 | Dwyer et al. |
| 5,710,889 | A | 1/1998 | Clark et al. |
| 5,715,314 | A | 2/1998 | Payne et al. |
| 5,715,402 | A | 2/1998 | Popolo |
| 5,717,989 | A | 2/1998 | Tozzoli et al. |
| 5,727,165 | A | 3/1998 | Ordish et al. |
| 5,760,917 | A | 6/1998 | Sheridan |
| 5,761,655 | A | 6/1998 | Hoffman |
| 5,771,291 | A | 6/1998 | Newton et al. |
| 5,771,380 | A | 6/1998 | Tanaka et al. |
| 5,790,790 | A | 8/1998 | Smith et al. |
| 5,794,219 | A | 8/1998 | Brown |
| 5,799,285 | A | 8/1998 | Klingman |
| 5,803,500 | A | 9/1998 | Mossberg |
| 5,818,914 | A | 10/1998 | Fujisaki |
| 5,826,244 | A | 10/1998 | Huberman |
| 5,835,896 | A | 11/1998 | Fisher et al. |
| 5,845,265 | A | 12/1998 | Woolston |
| 5,845,266 | A | 12/1998 | Lupien et al. |
| 5,850,442 | A | 12/1998 | Muftic |
| 5,872,848 | A | 2/1999 | Romney et al. |
| 5,873,069 | A | 2/1999 | Reuhl et al. |
| 5,884,056 | A | 3/1999 | Steele |
| 5,890,138 | A | 3/1999 | Godin et al. |
| 5,892,510 | A * | 4/1999 | Lau et al. ............... 715/866 |
| 5,905,975 | A | 5/1999 | Ausubel |
| 5,922,074 | A | 7/1999 | Richard et al. |
| 6,035,402 | A | 3/2000 | Vaeth et al. |
| 6,047,264 | A | 4/2000 | Fisher et al. |
| 6,061,448 | A | 5/2000 | Smith et al. |
| 6,085,176 | A * | 7/2000 | Woolston ............... 705/37 |
| 6,104,815 | A | 8/2000 | Alcorn et al. |
| 6,119,137 | A | 9/2000 | Smith et al. |
| 6,178,408 | B1 | 1/2001 | Copple et al. |
| 6,192,407 | B1 | 2/2001 | Smith et al. |
| 6,202,051 | B1 | 3/2001 | Woolston |
| 6,243,691 | B1 * | 6/2001 | Fisher et al. ............... 705/37 |
| 7,113,954 | B2 * | 9/2006 | Vogel ............... 707/101 |
| 2005/0086256 | A1 * | 4/2005 | Owens et al. ............... 707/103 R |

FOREIGN PATENT DOCUMENTS

| | | |
|---|---|---|
| WO | WO 96/34356 | 4/1996 |
| WO | WO 97/37315 | 3/1997 |
| WO | 99/18510 | 10/1998 |
| WO | WO 99/63461 | 5/1999 |
| WO | 00/32088 | 4/2001 |

OTHER PUBLICATIONS

Warbelow, A; Kokuryo, J, "Aucnet: TV Auction Network System". *Harvard Business School Case/Study*, Jul. 1989, pp. 1-15, HBVR# 9-190-001, USA.

"Personal Optimized Decision/Transaction Program", *IBM Technocal Disclosure Bulletin*, Jan. 1995, pp. 83-84, vol. 38, No. 1, USA.

Neo, BS, "The implementation of an electronic market for pig trading in Singapore", *Journal of Strategic Information Systems*, Dec. 1992, pp. 278-288, vol. 1, No. 5.

Rockoff, TE; Groves, M., "Design of an Internet-based system for remote Dutch auctions", *Internet Reaearch—Electrnic Networking Applications and Policy*, Jan. 1, 1995, vol. 5, No. 4, pp. 10-16.

Massimb, MN; Phelps, BD, "Electronic Trading, Market Structure and Liquifity", *Financial Analysts Journal*, Jan.-Feb. 1994, vol. 50, No. 1. pp. 39-50, Charlottesville, Virginia.

Post, DL; Coppinger, SS, et al., "Application of Auctions as a Pricing Mechinism for the Interchange of Electric Power", *IEEE Transactions on Power Systems*, Aug. 1995. pp. 7, vol. 10, No. 3.

Hess. CM; Kemerer, CF., "Computerized Loan Organization System: An Industry Case Study of the Electronic Markets Hypothesis", *MIS Quarterly*, Sep. 1994. vol. 18, No. 3. pp. 251-274.

Reck, Martin, "Formally Specifying and Automated Trade Execution System", *Journal of Systems and Software*, 1993, pp. 245-252, vol. 21, Elsevier Science Publishing Co., Inc. New York, NY.

"Anonymous Delivery of Goods in Electronic Commerce", *IBM Technocal Disclosure Bulletin*, Mar. 1996, pp. 363-366, vol. 39, No. 3.

Lee, G., "Electronic Brokerage and Electronic Auction: The Impact of IT on Market Structures", *Proceedings of the 29th HICSS*, 1996, pp. 397-406, vol. IV.

Clemins, E; Weber, B., "Evaluating the Prospects for Alternative Electronic Securities Markets", *International Conference on Information Systems*, 1991, pp. 53-61, vol. 12.

Mardesich, J., "Onsale Takes Auction gavel electronic", *Computer Reseller News*, Jul. 8, 1996, p. 2 continued on p. 32, Mountain View, California.

Siegmann, Ken, "Nowhere to go but up", *PC Week*, Oct. 23, 1995, p. 1-3, vol. 12, No. 42, Ziff-Davis Publishing Company.

"Onsale: Onsale Brings Thrill of Auctions and Bargain Hunting Online; Unique Internet retail service debuts with week-long charity auction for the Computer Museum in Boston", May 24, 1995, pp. 3.

Chris Preist, Marten vAN Tol, "International Conference on Information and Computation Economies", *Adaptive Agents in a Persistant Shout Double Auction*, (c) 1999, pp. 2.

Zwass, Vladimir., "Electronic Commerce: Structures and Issues", *International Journal of Electrnic Commerce*, Fall 1996, pp. 3-23, vol. 1, No. 1.

Schmid, BF., "The Development of Electronic Commerce", *Newsletter of the Competence Centre Electrnic Markets*, Oct. 1993, No. 9/10.

* cited by examiner

TAXONOMY-BASED DATABASE PARTITIONING

RELATED APPLICATIONS

This application claims the benefit of U.S. Provisional Application No. 60/248,466, filed Nov. 14, 2000, which is incorporated herein by reference.

COPYRIGHT NOTICE

This application claims the benefit of U.S. Provisional Application No. 60/248,466, filed Nov. 14, 2000, which is incorporated herein by reference. Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention relates to the field of computer databases, and more specifically, to a database architecture structured in accordance with an information taxonomy.

BACKGROUND OF THE INVENTION

A database is a collection of information organized in such a way that a computer program can quickly select desired pieces of data. Traditional databases are organized by fields, records, and files. A field is a single piece of information; a record is one complete set of fields; and a file, also known as a table, is a collection of records. A database may comprise a number of tables that are linked by indices and keys, or may be a collection of objects in an object-oriented database.

For example, an employee database may comprise an address book table and a salary table. Within the address book table, each employee record may comprise information such as the employee name, employee number, birth date, address, and hiring date, and within the salary table, each employee record may comprise information such as the employee number, hiring date, hiring level, job title, and salary. The tables and objects for a given database may exist on one or more database instances.

The amount of information that a typical database holds can be astronomical, particularly with Internet-based transactions where the collection and dissemination of information is so vast. In an effort to impart structure to information collected in a database, data (i.e., information in the database) can be organized and partitioned to make databases more manageable. Typically, data is organized and partitioned by item numbers, or numerical identifiers that identify an entry in a database.

For example, in an employee database keyed (i.e., uniquely identified) by employee numbers, data (i.e., employee records) can be organized and partitioned such that employee records 1-100 reside on database instance A; employee records 101-200 reside on database instance B; and employee records 201-300 reside on database instance C, for example. As another example, in a products database keyed by a product number, data can be organized and partitioned such that item numbers 1000-1999 reside on server A; item numbers 2000-2999 reside on server B; and item numbers 3000-3999 reside on server C.

A disadvantage of this system of organization is lack of ease of manageability. A database in which data is partitioned according to a numerical scheme does not lend itself to certain database management tasks, such as strategically splitting data across machines. The task of splitting fixed-size employee records 1-10,000, for example, across 3 machines can be a simple task. However, the complexity of the task may increase when splitting variable-size product records 1-10,000 across 3 machines, since there is no efficient way of partitioning the variable-size records to facilitate database management decisions.

For example, if a database administrator decided that higher-priced products should be stored on the most expensive platform, or that certain machines should be backed-up more frequently because they store high-activity products, it could not feasibly be determined how the records could be partitioned to accommodate these splits.

SUMMARY OF THE INVENTION

In one embodiment of the invention, described herein is a memory that facilitates splitting data by taxonomy. The memory may be accessed by an application program, and includes one or more top-level categories, where each top-level category comprises a subset of items; and also includes a category group corresponding to at least one of the top-level categories and the subset of the items belonging to the top-level categories.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Described herein is a method, system, and apparatus for partitioning a database by taxonomy. As used herein, a taxonomy refers to a classification of items. In embodiments of the invention, an auction database is illustrated, where the auction database comprises items for sale on an auction website. As used herein, a database refers to all instances of a collection of related information. For example, an auction database can refer to a collection of auction items on machine A for only a single database instance of the auction database, or it can refer to a collection of auction items on storage devices A, B, and C for multiple database instances of the auction database.

In embodiments of the invention, an auction database is partitioned such that there are multiple database instances of the auction database, and items are distributed across multiple storage devices, where each storage devices comprises one or more groups of auction items related by a category group.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

INTRODUCTION

Figure 1:
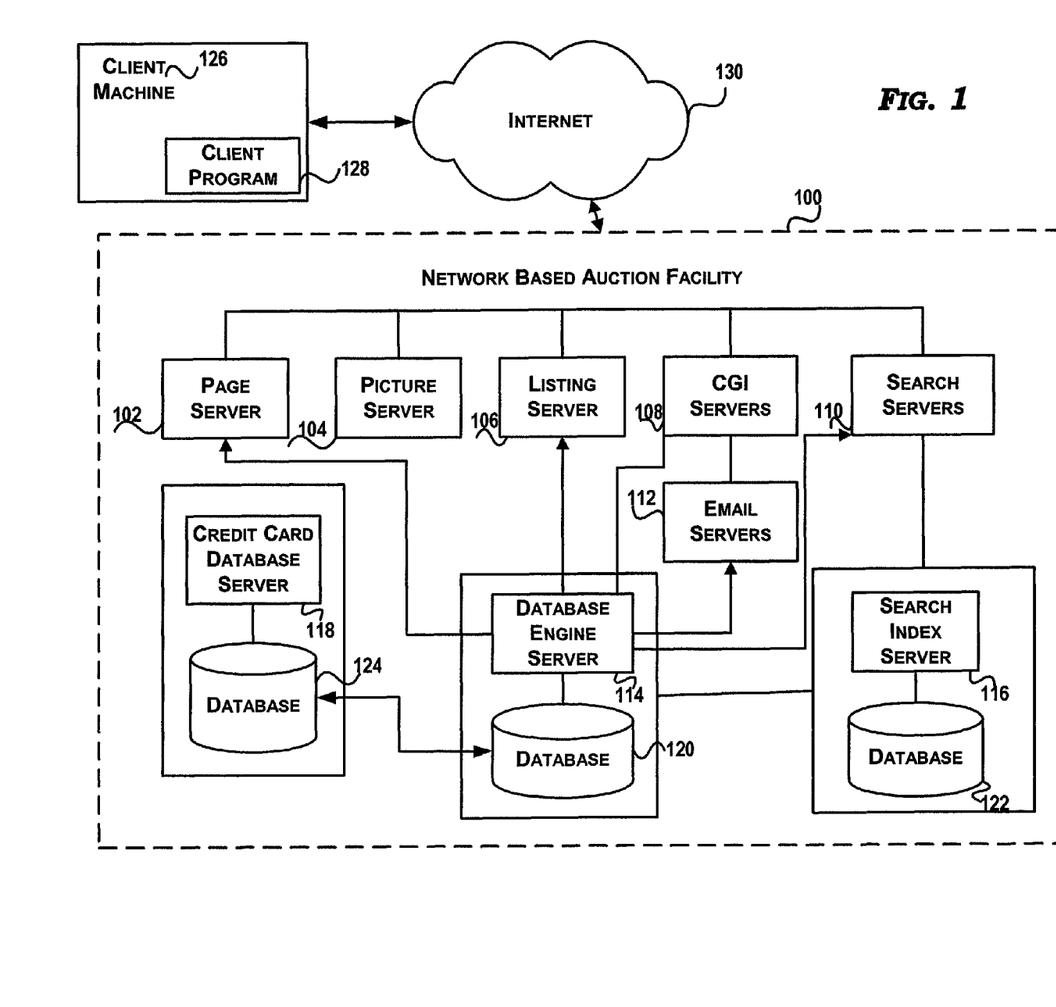
FIG. 1 is a block diagram illustrating an architecture for a network-based auction facility within which embodiments of the invention may be implemented.

Embodiments of the present invention may be implemented in an online registration page for a website auction, such as eBay.com of eBay™ Inc. of San Jose, Calif. FIG. 1 is a block diagram illustrating an architecture for a network-based transaction facility in the form of an Internet-based auction facility 100, such as eBay.com. While an exemplary embodiment of the present invention is described within the context of an auction facility, it will be appreciated by those skilled in the art that the invention will find application in many different types of computer-based, and network-based commerce facilities.

The auction facility 100 includes one or more of a number of types of front-end servers, namely page servers 102 that deliver Web pages (e.g., markup language documents), picture servers 104 that dynamically deliver images to be displayed within Web pages, listing servers 106, CGI (Common Gateway Interface) servers 108 that provide an intelligent interface to the back-end of facility 100, and search servers 110 that handle search requests to the facility 100. E-mail servers 112 provide, inter alia, automated e-mail communications to users of the facility 100. The back-end servers include a database engine server 114, a search index server 116, and a credit card database server 118, each of which maintains and facilitates access to a respective database 120, 122, 124.

The internet-based auction facility 100 may be accessed by a client program 128, such as a browser (e.g., Internet Explorer distributed by Microsoft Corp. of Redmond, Wash.) that executes on a client machine 126 and accesses the facility 100 via a network such as, for example, the Internet 130. Other examples of networks that a client may utilize to access the auction facility 100 include a wide area network (WAN), a local area network (LAN), a wireless network (e.g., a cellular network), or the Plain Old Telephone Service (POTS) network.

Figure 2:
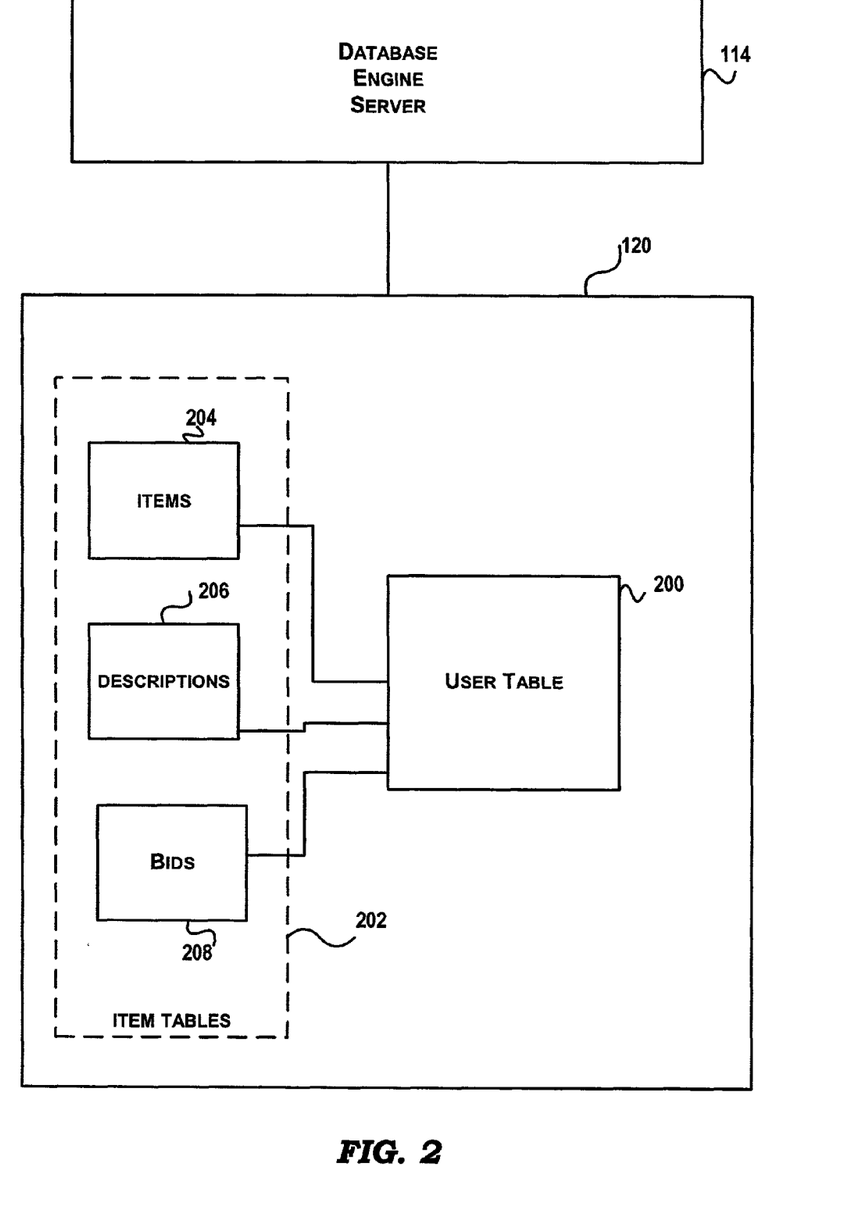
FIG. 2 is a block diagram illustrating an item database architecture in preferred embodiments of the present invention.

FIG. 2 is a diagram illustrating the database 120, maintained by and accessed via the database engine server 114, which at least partially implements and supports the auction facility 100. The database 120 may, in one embodiment, be implemented as a relational database, and includes a number of tables that are linked by indices and keys. In an alternative embodiment, the database 120 may be implemented as a collection of objects in an object-oriented database. In all embodiments, the tables or objects may be implemented on one or more storage devices.

Central to the database 120 is a user table 200, which contains a record for each user of the auction facility 100. A user may operate as a seller, buyer, or both, within the auction facility 100. The database 120 also includes item tables 202 that may be linked to the user table 200. Specifically, the item tables 202 comprise an items table 204, a description table 206, and a bids table 208. A user record in the user table 200 may be linked to multiple items that are being, or have been, auctioned via the facility 100. A link indicates whether the user is a seller or a bidder (i.e., buyer) with respect to items for which records exist within the item tables 202.

Under existing architecture, database 120 resides on a single storage device, such that item tables and user tables, for example, reside on the single storage device. Under an architecture of the present invention, database 120 may reside on a plurality of storage devices such that item tables and user tables may be split across multiple storage devices. In preferred embodiments of the invention, a storage device comprises a memory in a computer system, hereinafter generically referred to as a machine. Other storage devices, such as CD-ROMs and tape drives, are also within the scope of the invention.

Category Groups and Top-Level Categories

In preferred embodiments of the invention, database 120 comprises information about items for sale on an auction website. Items may comprise dolls, antiques, computers, and cars, for example, and are categorized by a top-level category for buyer convenience. For example, items may be categorized in any of the following top-level categories:

Antiques & Art
Books, Movies & Music
Coins & Stamps
Collectibles
Computers
Dolls, Figures
Jewelry, Gemstones
Photo & Electronics
Pottery & Glass
Sports
Toys, Bean Bag Plush
Everything Else
Great Collections It should be understood that this list is for illustrative purposes only, and does not represent an exhaustive or even a necessary list.

Figure 3:
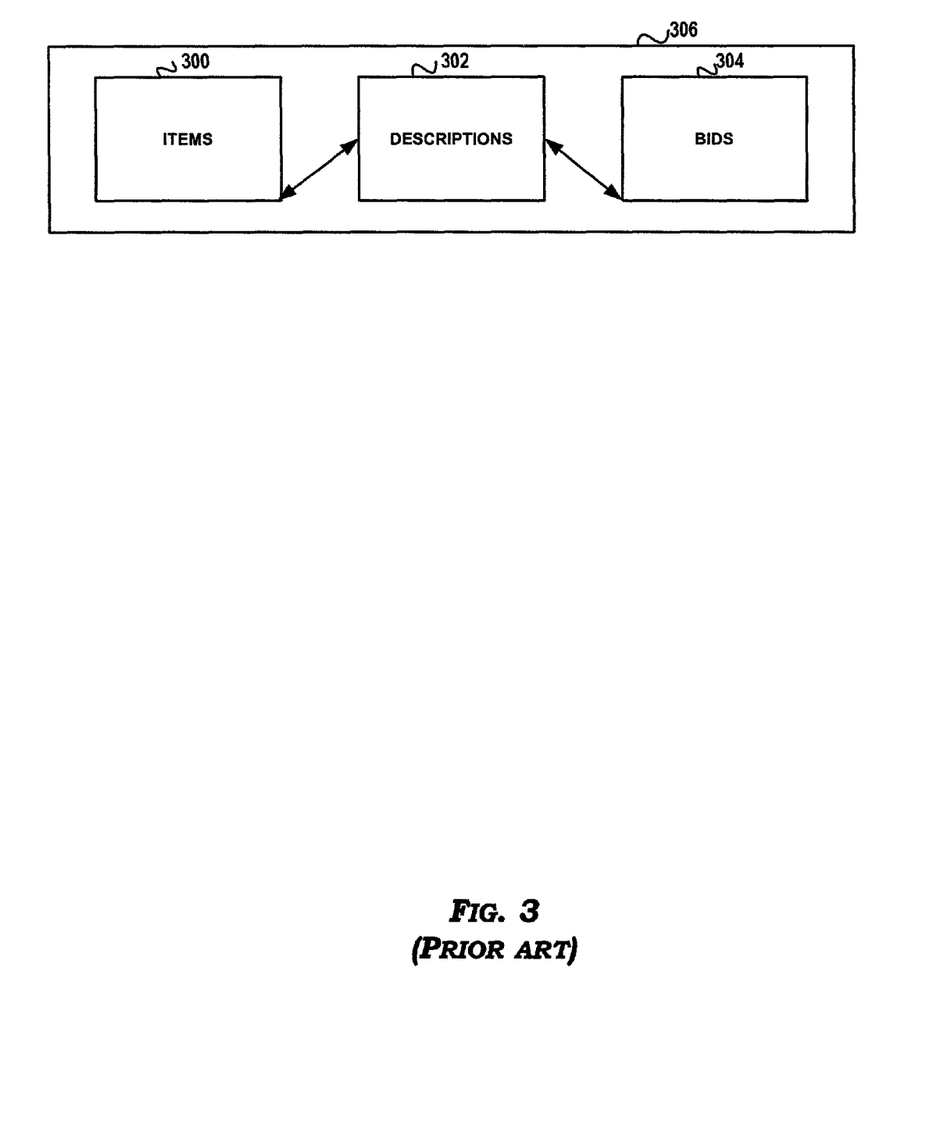
FIG. 3 is an object relation diagram showing a prior art relationship between item information objects and category groups.

FIG. 3 illustrates a prior art embodiment of the item tables architecture, where items 300, descriptions 302, and bids 304 for a given item are related by top-level category 306. For a given auction item, such as a porcelain doll, item information objects are created for item information. Item information objects include records comprising item 300, description 302, and bid 304 information that are related to a given auction item. Related item information objects, i.e., item information objects associated with the same item, may be located on a single database instance, or on multiple database instances.

Figure 4:
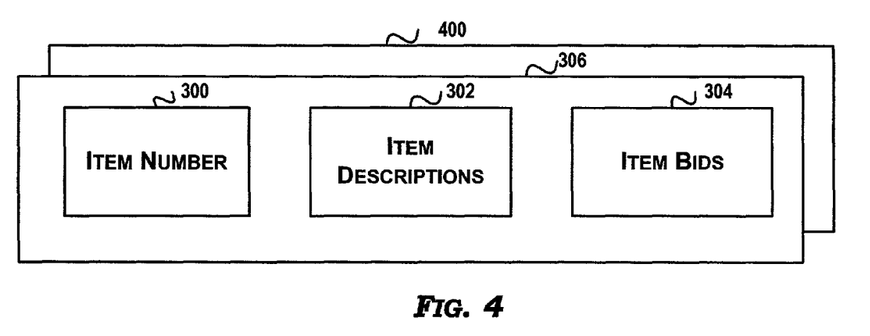
FIG. 4 is an object relation diagram showing a relationship between item information objects and category groups of the present invention.

FIG. 4 illustrates an embodiment of the item tables architecture, where the item information objects for a given item are related to one another by a category group 400 layer on top of a top-level category 306 layer.

Figure 5:
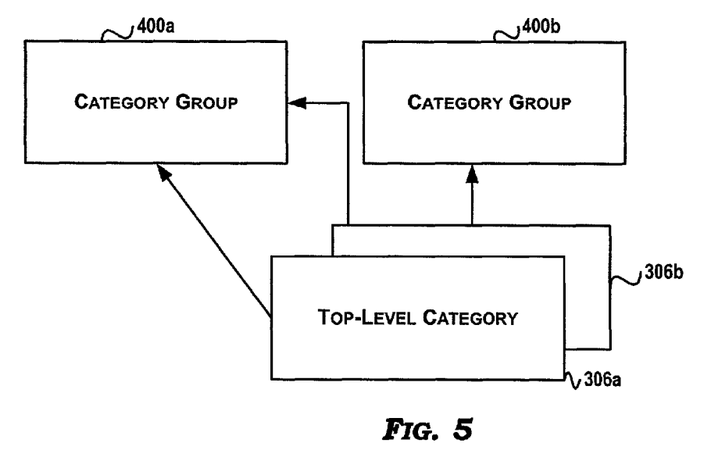
FIG. 5 is an object relation diagram showing a relationship between category groups and top-level categories of the present invention.

As illustrated in FIG. 5, each category group 400a, 400b comprises one or more top-level categories 300a, 300b, and each top-level category belongs to one or more category groups. For example, a category group "Category Group I" may comprise top-level categories "Dolls, Figures", "Coins & Stamps", and "Collectibles". Thus, in addition to being related by top-level category "Dolls, Figures", item information objects for the porcelain doll are also related by a category group, "Category Group I".

Each top-level category 306 may belong, or correspond, to one or more category groups 400, where a category group is identified by a category group identifier such as an alphanumeric label. For purposes of illustration, category groups are designated by a Roman numeral, such as "Category Group I", "Category Group II", etc. A top-level category 306a may correspond to one category group 400a, where every item in the top-level category 306a belongs to the same category group 400a, or a top-level category 306b may be partitioned such that items within a single top-level category 306b are divided into two or more category groups 400a, 400b. This can be implemented via a cross-reference table, or via methods and classes, for example.

Each category group 400a, 400b may exist on, or correspond to, one or more database instances. In other words, since a category group 400 comprises related tables of item information (i.e., items, item descriptions, and item bids), items in the related tables may be located on one or more database instances. Splitting tables within a category group may also be implemented via a cross-reference table, or via methods and classes, for example.

Adding Items to a Database Partitioned by Taxonomy

Item records are processed before they are added to database 120. In embodiments of the invention, an auction user adds an item to database 120 by entering item information through an item registration page. The item registration page solicits information about an item to be sold on an auction website, such as a "Title", "Category", "Description", "Picture URL", and "Item Location", to name a few.

An item number is created for the newly added item. In one embodiment, an item number comprises an automatically generated number and a category group 400 appended to the automatically generated number. As an item (and its item number) corresponds to a top-level category, and a top-level category belongs to a category group, the appended category group 400 corresponds to the item. This embodiment entails automatically generating a number, where the number can be arbitrary, or sequential.

The top-level category 306 corresponding to the entered item is used to determine a corresponding category group 400. A category group identifier corresponding to the category group 400 for the given item is then appended to the automatically generated number to generate an item number. The automatically generated number can be globally unique, or it can be locally unique, where the automatically generated number is generated within the category group to which the item belongs.

In another embodiment, an item number is generated for an item in accordance with a numbering scheme unique to the item's category group. For example, a "Category Group I" category group may comprise item numbers 1-10,000 corresponding to low-volume top-level categories, and a "Category Group II" may comprise item numbers 50,000-1,000,000 corresponding to high-volume top-level categories. Thus, if an item is added, and corresponds to "Category Group II" (i.e., the item belongs to a top-level category corresponding to "Category Group II"), then an item number will be generated in the range of 50,000-1,000,000.

An item information object comprising a record is created in item table and a related item information object comprising a corresponding record is created in item descriptions table. Records in item table comprise data fields for item information such as "Title" and "Category", and records in item descriptions table comprise data fields for information such as "Description". Records in the items table also comprise an item number. As buyers place bids on an auction item, related item information objects comprising records corresponding to the auction item are created in the bids table.

Searching for Items in a Database Partitioned by Taxonomy

A website auction user may search for items in auction database 120. Auction user enters a search word or phrase to search for items. In one embodiment, a user may request to search all categories. In this embodiment, each category group comprises its own search database, and well-known methods of text search are executed over each search database. Item numbers corresponding to relevant items are returned.

In an alternative embodiment, users are limited to search within top-level categories. A user selects a top-level category to conduct a search, and well-known methods of text search are executed over the search database corresponding to the selected top-level category.

In yet another embodiment, multiple streams of items (one from each category group) are input to the search database. The indexing is then serialized when all updates from all groups are completed.

Listing Items in a Database Partitioned by Taxonomy

A website auction user may list items in the auction database 120. In one embodiment, a ListingsProduce method is executed for each category group to generate an items.map file for each category group. A dynamic link library (DLL) is programmed to read multiple items.map files, which then displays items in auction database 120.

In another embodiment, there is a pool having one or more machines for each category group. In this case, the DLL maintains link consistency between the pages.

Caches

Since item information is potentially split across multiple databases, joins with tables comprising other information are not always possible. For instance, each item record tracks a seller of the item, as well as a high bidder for the item. Under the current architecture, when a given item is displayed, an items table comprising seller I.D.s and high bidder I.D.s, a seller table comprising seller I.D.s and seller text, and a bidder table comprising bidder I.D.s and bidder text, which all exist on the same database instance, are joined such that each item corresponds to a seller I.D. as well as seller text, and to a high bidder I.D. as well as high bidder text. This all occurs under a single join operation.

Since a join operation cannot always be utilized under an architecture of the existing invention, other methods must be utilized to obtain information. In the example above, seller and high bidder text for a given item can be obtained by matching the seller I.D. in the item record to the seller I.D. in the seller record, and by matching the high bidder I.D. in the item record to the bidder I.D. in the bidder record. However, since two operations are now performed rather than a single operation, machine performance may become an issue. Consequently, caches are used in the present invention to optimize data retrieval.

User List Cache

A user list cache makes seller and bidder text available to requesting processes. In reference to the example above, when an item is displayed, a user list cache is accessed to determine if the corresponding seller I.D. and the corresponding high bidder I.D. for the item exist. If the I.D.s exist in the cache, then the seller and bidder text are retrieved from the cache and displayed. If not, then the seller I.D. is keyed to the seller I.D. in the seller table, and a record is created for the seller I.D. and corresponding text in the cache; and the bidder I.D. is keyed to the bidder table, and a record is created for the bidder I.D. and corresponding text in the cache.

The next time the seller I.D. or the bidder I.D. is encountered, the corresponding text can be retrieved from the cache on the machine from which the application is being executed, rather than from the database instance, which can be on another machine.

Category Group Cache

A category group cache makes item information, such as an item description, available to requesting processes. For instance, when an item is displayed, a category group cache is accessed to determine if the item description corresponding to the item exists in the cache. If the item exists in the cache, then the corresponding item description is retrieved from the cache and displayed. If not, then the item is keyed to the item description table, and a record is created for the item and its corresponding item description in the cache. The next time the item is encountered, the corresponding item description can be retrieved from the cache on the machine from which the application is being executed, rather than from the database instance, which can be on another machine.

Seller Category Group Cache and Bidder Category Group Cache

Auction users may request to track bidding and selling activities. If a user requests items that the user has bidded on, a list of items and corresponding item information is retrieved for the user. Similarly, if a user requests items that the user has listed for sale, a list of those items and corresponding item information is retrieved for the user. However, since item information is not necessarily located on the same database instance, item information objects cannot be joined. Consequently, to find all items would require searching all category groups, which can be located on more than one database instance, and would be a time-consuming process.

Instead, item information is obtained from a seller category group cache or a bidder category group cache. When a user bids on or sells an item in a category group, an entry for the user is created in the user category group cache if the user doesn't already exist. The user entry in the user category group cache is then associated with the category group corresponding to the item in question.

These caches facilitate a request, for example, to find all items that a particular seller is selling, or to find all items that a particular buyer is bidding on. Instead of searching through every category group to find items associated with a particular seller or a particular bidder, the caches can be consulted to find only those category groups in which the seller is selling, or in which the buyer is bidding.

CONCLUSION

The invention as described above provides several advantages over what is currently done. The failure of any single machine comprising one or more category groups will not affect all items. Splitting items across several database instances allows items to be added without having to worry about running a machine to capacity. Splitting data by taxonomy also simplifies database management tasks if a particular business associated with the items provides some predictability about the size and activity of the data being split off. Taxonomy-based partitioning provides tangible benefits. Data stored in accordance with the taxonomy allows data to be more efficiently stored, and allows data to be more efficiently backed-up.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, embodiments of this invention should not be limited to the area of e-commerce, or online auctions, to the extent that the embodiments do not read upon prior art. It should be understood by one skilled in the art that concepts of this invention have general application in the area of database management. Furthermore, any references to specific top-level categories or category groups should not be construed as being limited to those discussed. It should be understood that such references are for illustrative purposes only.

What is claimed is:

1. A system comprising:
a memory comprising one or more top-level categories, each top-level category including a subset of the items; a category group including at least one of the top-level categories and the subset of the items belonging to at least one of the top-level categories; and at least one other category group, the at least one other category group including a remainder of the top-level categories, wherein items corresponding to a given top-level category are split among a plurality of category groups; and
a server comprising a database engine coupled to the memory, the database engine configured to provide a listing of top-level categories, to determine a top-level category corresponding to an item, to determine a category group corresponding to the top-level category, to assign the top-level category and the category group to the corresponding item, to partition the top-level category by dividing items within a single top-level category into two or more category groups, and to partition a database in the memory by category group into multiple database instances of the database across multiple storage devices, each storage device comprising groups of items related by category group, the database engine further configured to receive a record of the item to be added to a database in the memory, to generate an item number for the item, the item number comprising an automatically generated number and a category group identifier corresponding to the category group of the item, the category group identifier appended to the automatically generated number, and to generate an item information object corresponding to the item number in the database.

2. The system of claim 1, wherein the memory is to be accessed by an application program and includes item records corresponding to an item, said item records belonging to said item as being related by a top-level category, and being related by a category group corresponding to the top-level category.

3. The system of claim 2, wherein a first one of related item records resides on a database instance different from a second one of related item records based on the item number.

4. The system of claim 2, wherein a first one of item records corresponding to the same top-level category belongs to a category group different from a second one of item records corresponding to the same top-level category.

5. The system of claim 2, wherein the memory is accessed by an application program to process transactions on an auction website.

6. A system comprising:
- a memory to be accessed by an application program, the memory comprising at least one top-level category identifier; at least one category group identifier corresponding to the at least one top-level category identifier; and one or more item information objects each corresponding to a top-level category identifier, and each corresponding to a category group that corresponds to the top-level category identifier, each item information object corresponds to a record, the record including information including at least one of the following: an item number; an item description; or one or more item bids; and
- a server comprising the application program coupled to the memory, the application program configured to provide a listing of top-level categories, to determine a top-level category corresponding to an item, to determine a category group corresponding to the top-level category, to determine one or more locations corresponding to the category group, to create at least one item information object corresponding to the item, to assign the top-level category and the category group to the at least one item information object, to store the at least one item information object at the one or more locations corresponding to the category group, to partition the top-level category by dividing items within a single top-level category into two or more category groups, and to partition a database in the memory by category group into multiple database instances of the database across multiple storage devices, each storage device comprising groups of items related by category group, the application program further configured to receive a record of the item to be added to a database in the memory, to generate an item number for the item, the item number comprising an automatically generated number and a category group identifier corresponding to the category group of the item, the category group identifier appended to the automatically generated number, and to generate an item information object corresponding to the item number in the database.

7. The system of claim 6, wherein related item information objects are located on a single database instance.

8. The system of claim 6, wherein the item information objects each correspond to an auction item on an auction website.

9. The system of claim 6, wherein a first item information object corresponding to a first item of a first category group resides on a first database instance of the database based on the item number of the first item, a second item information object corresponding to a second item of a second category group resides on a second database instance of the database based on the item number of the second item.

10. The system of claim 9, wherein the first database instance of the database resides on a first machine, wherein the second database instance of the database resides on a second machine separate from the first machine.

* * * * *